United States Patent Office 3,424,740
Patented Jan. 28, 1969

3,424,740
BENZOTHIAZOLYL MONOAZO DYES
Max A. Weaver and David J. Wallace, Kingsport, Tenn., assignors to Eastman Kodak Company, Rochester, N.Y., a corporation of New Jersey
No Drawing. Filed Oct. 24, 1965, Ser. No. 505,001
U.S. Cl. 260—158          8 Claims
Int. Cl. C09b 29/36; D06 1/02

ABSTRACT OF THE DISCLOSURE

Benzothiazolyl-azo-aniline compounds containing certain substituted succinimido and glutarimido groups connected to the aniline nitrogen atom through an alkylene bridge are useful as dyes for hydrophobic textile materials.

---

This invention relates to azo compounds especially useful as dyes for textile fibers, yarns and fabrics.

The azo compounds have the general formula:

(I)
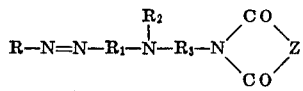

wherein R represents a 2-benzothiazolyl radical unsubstituted or substituted, i.e.,

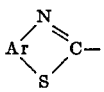

in which Ar is an ortho-arylene radical of the benzene series, including ortho-phenylene and ortho-phenylene substituted by radicals such as alkylsulfonyl, e.g., lower alkylsulfonyl, nitro, lower alkanoyl, e.g., acetamido, cyano, thiocyano, sulfamoyl, lower cyanoalkylsulfonyl, halogen, lower alkylsulfonamido, lower alkoxy, lower alkyl, lower hydroxyalkyl, lower alkylthio, lower trifluoroalkyl, lower cyanoalkyl, lower carbalkoxy: $R_1$ represents a monocyclic carbocyclic aromatic group of the benzene series derived from an aminoalkylaniline coupling component and including p-phenylene and p-phenylene substituted phenylene such as phenylene; alkylphenylene, e.g., o,m-tolylene; alkoxyphenylene, e.g., o,m-methoxyphenylene, halophenylene, e.g., o,m-chlorophenylene; alkysulfonylphenylene, e.g., o,m-methylsulfonylphenylene; alkylsulfonamidophenylene, e.g., o,m-methylsulfonamidophenylene; di(alkylsulfonyl)phenylene, e.g.,2,5-di(methylsulfonyl)phenylene; dicarboxylicacidimido with lower alkyl; e.g., o,m-methyl-p-phenylene; lower alkoxy, e.g., o,m-methoxy-p-phenylene; halogen, e.g., o,m-chloro-p-phenylene; lower alkylthio, e.g., o,m-methylthio; lower alkanoylamino, e.g., o,m-acetamido; lower alkylsulfonamido, e.g., o,m-methylsulfonamido; or benzamido, e.g., benzamido-p-phenylene; $R_2$ represents hydrogen or an alkyl radical including unsubstituted alkyl, preferably lower alkyl, i.e., from 1 to 4 carbon atoms, and substituted alkyl such as hydroxy-alkyl, e.g., hydroxyethyl; ethyl; benzyl phenoxyalkyl, e.g., β-phenoxyethyl; lower alkoxyalkyl, e.g., methoxyethyl; cyano-alkyl, e.g., cyanoethyl; lower cyanoalkoxyalkyl, e.g., β-cyanoethoxy-ethyl; lower alkaneyloxalkyl, e.g., acetoxyethyl; lower carbalkoxyalkyl, e.g., carbethoxyethyl; holagenoalkyl, e.g., chloroethyl; hydroxy-halogenoalkyl, e.g., β-hydroxy-γ-chloropropyl; lower alkysulfonyl-alkyl, e.g., methylsulfonylethyl; lower alkyl

—OCOOCH$_2$CH$_2$— e.g., CH$_3$—OCOO$_2$CH$_2$; carbamoylalkyl, e.g., carbamoylethyl; lower alkylcarbamoylalkyl, e.g., ethylcarbamoylbenzyl phenoxyalkyl, e.g., β-phenoxyethyl; lower alkylkylsulfonamidoalkyl, e.g., methylsulfonamidoethyl; dicarboxamido-alkyl, e.g., β-dicarboxamidoethyl, etc., or $R_2$ represents cyclo-alkyl or a monocyclic carbocyclic aromatic radical of the benzene series, e.g., unsubstituted phenyl and substituted phenyl such as lower alkylphenyl, lower alkoxyphenyl, or halophen. A preferred group represented by $R_2$ includes hydrogen, alkyl, alkoxyalkyl, phenoxyalkyl, alkanoyloxyalkyl, halo-alkyl, hydroxyalkyl, carbethoxyalkyl or cyanoalkyl, the alkyl groups of which are lower alkyl, $R_3$ represnts lower alkylene, lower hydroxyalkylene, lower alkanoyloxyalkylene or lower chloroalkylene, Z represents one of the groups

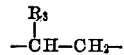

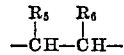

or

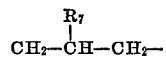

in which $R_4$ represents a phenylcarbamoyloxy group, e.g.,

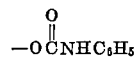

lower alkylcarbamoyloxy, e.g.,

halogen, e.g., chlorine or bromine, mercapto, lower alkylthio, e.g., SCH$_3$, SC$_2$H$_5$, lower alkanoyl, e.g., COCH$_3$, COC$_2$H$_5$, lower alkanoyloxy, e.g.,

amino, lower alkanoylamino, e.g., NHCOCH$_3$, NHCOC$_3$H$_7$, or carbamoyl; both $R_5$ and $R_6$ represent hydroxyl, halogen or lower alkanoyloxy, e.g., as present in the chains:

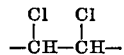

and

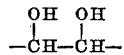

and

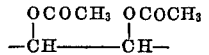

or $R_5$ represents halogen when $R_6$ is hydroxyl or lower alkanoyloxy as present in the chains:

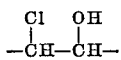

and

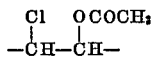

$R_7$ represents halogen, hyroxyl, alkoxy or lower alkanoyloxy.

Herein, alkyl, alkylene, lower alkyl and lower alkylene mean the alkyl chain, straight or branch-chained, contains 1 to 4 carbon atoms.

As can be seen from the examples below, the various substituents attached to groups R, $R_1$ and $R_2$ serve primarily as auxochrome groups to control the color of the azo compound. In general, azo compounds very useful as textile dyes are obtained by wide variation of the substituents.

The azo compounds are prepared by coupling the diazonium salts of 2-aminobenzothiazoles, well known in the art, with substituted aniline coupling components having the formula

II)

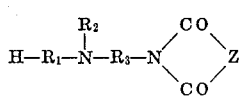

wherein $R_1$, $R_2$, $R_3$ and Z have the above meaning.

The coupling components of Formula II containing the dicarboximido radical are prepared by one of several known methods illustrated in the examples:

or

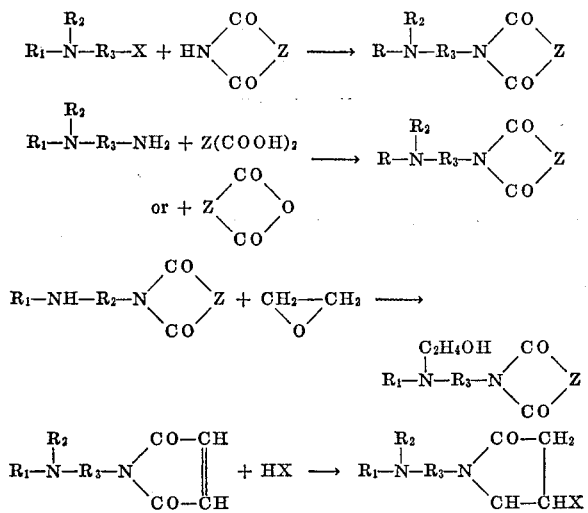

X represents halogen; $R_1$, $R_2$ and $R_3$ are as defined above.

The azo compounds can be used for dyeing textile materials including synthetic polymer fibers, yarns and fabrics giving a variety of fast shades including red and violet shades when applied by conventional dyeing methods. The azo compounds are useful, for example, for dyeing polyester, polyamide and cellulose acetate fibers and when used for dyeing such hydrophobic fibers should be free of water-solubilizing groups such as carboxyl and sulfo. In general, the azo compounds have good fastness, for example, to light, washing, gas (atmospheric fumes) and sublimation. The azo compounds can also be expected to respond favorably to other textile dye tests such as described in the A.A.T.C.C. Technical Manual, 1964 edition, depending in part upon the particular dye used and fiber being dyed.

The azo compounds of Formula I above are similar in structure to the azo compounds of U.S. 3,161,631 also containing a dicarboximido radical. However, in the compounds of the present invention, in the radical

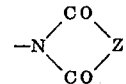

Z does not include the group $-CH_2-CH_2-$ of the compounds of U.S. 3,161,631, but includes only groups

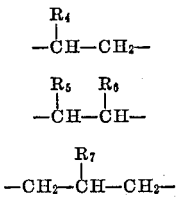

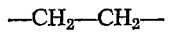

in which the $R_4-R_7$ substituents are defined above. The azo compounds of our invention containing these $R_4-R_7$ substituents possess unique properties compared to the compounds in which Z represents the group $$-CH_2-CH_2-$$

Our azo compounds possess substantially better fastness, e.g., to sublimation and light and possess better affinity for textile fiber, depending in part upon the substituent $R_4-R_7$ in use and the particular fiber being dyed.

The azo compounds of the invention may be used for dyeing hydrophobic fibers such as linear polyester, cellulose ester, acrylic, polyamide, etc, fibers in the manner described in U.S. Patents 2,880,050, 2,757,064, 2,782,187 and 2,043,827. The following examples illustrate methods by which the azo compounds of the invention can be used to dye polyester textile materials.

0.1 gram of the dye is dissolved in the dye pot by warming in 5 cc. of ethylene glycol monomethyl ether. A 2% sodium-N-methyl-N-oleyl taurate and 0.5% sodium lignin sulfonate aqueous solution is added, with stirring, until a fine emulsion is obtained. Water is then slowly added to a total volume of 200 cc. 3 cc. of Dacronyx (a chlorinated benzene emulsion) are added and 10 grams of a textile fabric made of Kodel polyester fibers are entered. The fabric is worked 10 minutes without heat and then for 10 minutes at 80° C. The dyebath is then brought to the boil and held at the boil for one hour. Following this, the fabric is rinsed in warm water, then scoured in an aqueous 0.2% soap, 0.2% soda ash solution. After scouring the fabric is rinsed with water and dried. Accordingly, since the azo compounds of the invention are water-insoluble, they can be applied from aqueous dispersions in the manner of the so-called "dispersed dyes." However, coloration can also be effected, for example, by incorporating the azo compounds into the spinning dope and spinning the fiber as usual. The azo compounds of our invention have varying utility as dyes. The degree of utility varies, for example, depending upon the material being dyed and the formula of the azo compound. Thus, for example, all the dyes will not have the same degree of utility for the same material.

Polymeric linear polyester materials of the terephthalate type are illustrative of the linear aromatic polyester textile materials that can be dyed with the new azo compounds of our invention. The terephthalate fibers sold under the trademarks "Kodel," "Dacron" and "Terylene," for example, in the form of filaments, yarn and fabric, for example, are illustrative of the polyester textile materials that can be dyed. Kodel polyester fibers are more particularly described in U.S. Patent 2,901,446. Dacron and Terylene polyester fibers are described, for example, in U.S. Patent 2,465,319. The polymeric linear polyester materials disclosed in U.S. Patents 2,945,010, 2,957,745 and 2,989,363, for example, can be dyed. The linear aromatic polyester materials specifically named have a melting point of at least 200° C.

Nylon, in fiber, yarn and fabric form is representative of polyamides which can be dyed with the azo compounds.

The following examples will serve to illustrate our invention.

EXAMPLE 1

(A) Preparation of the coupler.—17.8 g. N-(2-aminoethyl)-N-ethyl-m-toluidine and 13.4 g. malic acid were heated together at 145–150° C. for one hour. The reaction mixture was poured into water and collected by filtration. After recrystallization from 75 ml. of ethanol, the material melted at 98–99° C. The product was obtained in 58% yield and had the following structure:

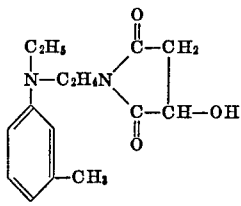

(B) Preparation of the dye.—A solution of 2.28 g. 2-amino - 6 - methylsulfonylbenzothiazole in 50 g. sulfuric acid was cooled to −5° C. and a solution of 0.72 g. of NaNO$_2$ dissolved in 5 ml. concentrated H$_2$SO$_4$ was added, keeping the temperature less than 0° C. After stirring for 1.75 hours at about 0° C. the reaction solution was added to a solution of 2.76 g. N-[2-(N-ethyl-m-toluidino)ethyl]malimide, Example 1(A), in 100 ml. 15% H$_2$SO$_4$, all at about 5° C. The coupling was continued at this temperature for two hours, then drowned with water, filtered, washed with water and the dye dried in air. The product dyes cellulose acetate and polyester fibers a brilliant shade of red with good fasteness properties. The dye has the following structure:

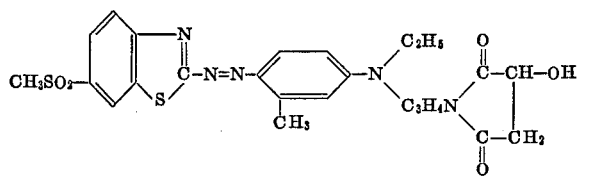

(C) Preparation of the dye.—One gram of the above dye was heated in 5 cc. of acetic acid and 5 cc. of acetic anhydride on a steam bath for one hour. The reaction mixture was drowned into water, filtered and air dried. The product, which had the following structure, dyed cellulose acetate and polyester fibers a deep fast blue-violet shade.

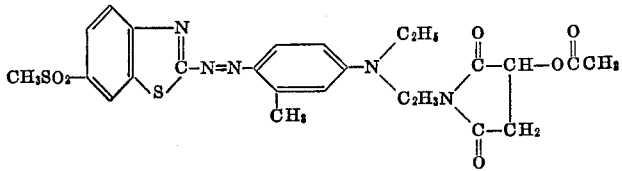

EXAMPLE 2

(A) Preparation of the coupler.—13.8 g. N-[2-(N-ethyl-m-toluidino)ethyl]malimide, (Example 1(A), 6.0 g. phenyl isocyanate, 3 drops triethylamine and 100 ml. benzene were refluxed together for 2½ hours. The benzene was evaporated off to yield an oily product, which crystallized on standing. The M.P. after two recrystallization from ethanol was 103–105° C. The coupler had the following structure:

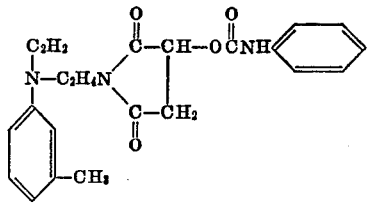

(B) Preparation of the dye.—0.72 g. sodium nitrite was added portionwise to 5 ml. concentrated H$_2$SO$_4$, the solution was cooled in an ice bath to about 0° C. and 10 ml. 1:5 acid (one part propionic:five parts acetic) was added below 15° C. Then at below 10° C. 1.75 g. 2-amino-6-cyanobenzothiazole was added, followed by 10 ml. 1:5 acid. The reaction was stirred two hours at 0–5° C. and added at about 5° C. to a solution of 3.95 g. N-[2-(N - ethyl-m-toluidino)ethyl] - 2 - hydroxysuccinimide carbanilate, from (A), dissolved in 100 ml. 1:5 acid. Solid ammonium acetate was added until the solution turned Congo red paper brown. After allowing to couple two hours at ice-bath temperature, the reaction mixture was drowned with water, filtered, washed with water and air dried. The product dyes cellulose acetate and polyester fibers bright red shades and has the following structure:

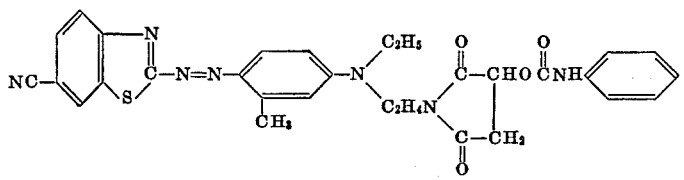

EXAMPLE 3

Preparation of nonacetylated coupler of Example 32 below 30.0 g. N-2-aminoethyl-m-toluidine and 26.8 g. malic acid were heated together at 150–160° C. for one hour and then at 180° C. for 30 minutes. The reaction mixture was allowed to cool and 20 ml. epichlorohydrin plus 200 ml. ethanol were added. After refluxing 20 hours, the alcohol was evaporated off to yield 69 g. of product which failed to crystallize on standing. The product had the following structure:

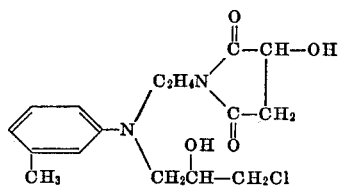

The examples in the following table were prepared by one of the preceding methods and may be identified from the following formula:

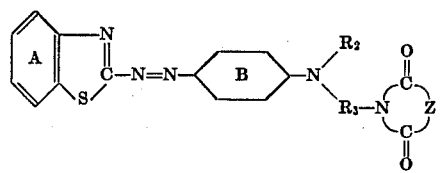

The color refers to the dyeing on Dacron polyester fabric.

TABLE

| Example | Substituents on Ring A | Substituents on Ring B | R₂ | R₃ | Z | Color |
|---|---|---|---|---|---|---|
| 4 | 6-CN | 3-CH₃ | —C₂H₅ | —CH₂CH₂— | —CH₂CH(Cl)— | Red. |
| 5 | 6-CN | 3-CH₃ | —C₂H₅ | —CH₂CH₂— | —CH₂CH(OH)— | Red. |
| 6 | 6-CN | 3-CH₃ | —C₂H₅ | —CH₂CH₂— | —CH₂CH(OCOCH₃)— | Red. |
| 7 | 6-CN | 3-CH₃ | —C₂H₅ | —CH₂CH₂— | —CH₂CH(SH)— | Red. |
| 8 | 6-CN | None | —C₂H₅ | —CH₂CH₂— | —CH₂CH(OH)— | Red. |
| 9 | 6-CN | None | —C₂H₅ | —CH₂CH₂— | —CH₂CH(OCOCH₃)— | Red. |
| 10 | 6-CN | None | —C₂H₄OH | —CH₂CH₂— | —CH₂CH(OCOCH₃)— | Red. |
| 11 | 6-CN | None | —C₂H₄Cl | —CH₂CH₂— | —CH₂CH(OCOCH₃)— | Red. |
| 12 | 6-SO₂CH₃ | 3-CH₃ | —C₂H₅ | —CH₂CH₂— | —CH₂CH(Cl)— | Red. |
| 13 | 6-SO₂CH₃ | 3-CH₃ | —C₂H₅ | —CH₂CH₂— | —CH₂CH(OCONHC₆H₅)— | Red. |
| 14 | 6-SO₂CH₃ | 3-CH₃ | —C₂H₅ | —CH₂CH(CH₃)CH₂— | —CH₂CH(OCONHC₆H₅)— | Red. |
| 15 | 5-SO₂CH₃ | 3-Cl | —C₂H₅ | —CH₂CH₂— | —CH(Cl)CH(Cl)— | Red. |
| 16 | 6-SO₂CH₃ | 3-OCH₃ | —C₂H₅ | —CH₂CH₂— | —CH(OH)CH(OH)— | Red. |
| 17 | 6-SO₂CH₃ | 3-NHCOCH₃ | —C₂H₅ | —CH₂CH₂— | —CH(OH)CH(OH)— | Red. |
| 18 | 6-SO₂CH₃ | 2-CH₃ | H | —CH₂CH₂— | —CH(OH)CH(OH)— | Scarlet. |
| 19 | 6-SO₂CH₃ | 2-Cl | H | —CH₂CH₂— | —CH(OH)CH(OH)— | Do. |
| 20 | 6-SO₂CH₃ | 2-CH₃-5-OCH₃ | —C₂H₅ | —CH₂CH₂— | —CH(OH)CH(OH)— | Violet. |
| 21 | 6-SO₂CH₃ | 2,5-di-OCH₃ | —C₂H₅ | —CH₂CH₂— | —CH(OH)CH(OH)— | Do. |
| 22 | 6-NO₂ | 3-CH₃ | —C₂H₅ | —CH₂CH₂— | —CH₂CH(NH₂)— | Do. |
| 23 | 6-NO₂ | 3-CH₃ | —C₂H₅ | —CH₂CH₂— | —CH₂CH(NHCOCH₃)— | Do. |
| 24 | 6-NO₂ | 3-CH₃ | —C₂H₅ | —CH₂CH₂— | —CH₂CH(COCH₃)— | Do. |
| 25 | 6-NO₂ | 3-CH₃ | —C₂H₅ | —CH₂CH₂— | —CH₂CH(CONH₂)— | Do. |
| 26 | 6-NO₂ | 3-CH₃ | —C₂H₅ | —CH₂CH₂— | —CH₂CH(OH)CH₂— | Do. |
| 27 | 6-NO₂ | 3-CH₃ | —C₂H₅ | —CH₂CH₂— | —CH₂CH(Cl)CH₂— | Do. |
| 28 | 6-NO₂ | 3-CH₃ | —C₂H₅ | —CH₂CH₂— | —CH₂CH(OCOCH₃)CH₂ | Do. |
| 29 | 6-NO₂ | 3-CH₃ | —C₂H₅ | —CH₂CH₂— | —CH₂CH(OCOCH₃)— | Do. |

3,424,740

TABLE—Continued

| Example | Substituents on Ring A | Substituents on Ring B | $R_2$ | $R_3$ | Z | Color |
|---|---|---|---|---|---|---|
| 30 | 6-$NO_2$ | 3-$CH_3$ | —$C_2H_5$ | —$CH_2CH_2$— | —$CH_2CH$(—$SCH_3$)— | Do. |
| 31 | 6-$NO_2$ | 3-$CH_3$ | —$C_2H_5$ | —$CH_2CH_2$— | —$CH_2CH$(—$OCOCH_3$)— | Do. |
| 32 | 6-$NO_2$ | None | —$CH_2CH$(OH)$CH_2Cl$ | —$CH_2CH_2$— | —$CH_2CH$(—$OCOCH_3$)— | Red. |
| 33 | 6-$NO_2$ | 3-$CH_3$ | —$C_2H_4CN$ | —$CH_2CH_2$— | —$CH_2CH$(—OH)— | Violet. |
| 34 | 6-$NO_2$ | 3-$CH_3$ | —$C_2H_4OCH_3$ | —$CH_2CH_2$— | —$CH_2CH$(—OH)— | Do. |
| 35 | 6-$NO_2$ | 3-$CH_3$ | —$C_2H_4OCOCH_3$ | —$CH_2CH_2$— | —$CH_2CH$(—OH)— | Do. |
| 36 | 6-$NO_2$ | 3-$CH_3$ | —$C_2H_4CONH_2$ | —$CH_2CH_2$— | —$CH_2CH$(—OH)— | Do. |
| 37 | 6-$NO_2$ | 3-$CH_3$ | Phenyl | —$CH_2CH_2$— | —$CH_2CH$(—$OCOCH_3$)— | Do. |
| 38 | 6-$NO_2$ | 3-$CH_3$ | —$C_4H_9$ | —$CH_2CH_2$— | —$CH_2CH$(—$OCOCH_3$)— | Do. |
| 39 | 6-$NO_2$ | 3-$CH_3$ | Cyclohexyl | —$CH_2CH_2$— | —$CH_2CH$(—$OCOCH_3$)— | Do. |
| 40 | 6-$NO_2$ | 3-$CH_3$ | —$C_2H_4SO_2CH_3$ | —$CH_2CH$($CH_3$)—$CH_2$— | —$CH_2CH$(—$OCOCH_3$)— | Do. |
| 41 | 6-$NO_2$ | 3-$CH_3$ | —$C_2H_4OH$ | —$CH_2CH$($CH_3$)—$CH_2$— | —$CH_2CH$(—Cl)— | Do. |
| 42 | 6-$SO_2NH_2$ | 3-Cl | —$C_2H_5$ | —$CH_2CH_2$— | —$CH_2CH$(—Cl)— | Red. |
| 43 | 6-$SO_2NH_2$ | 3-$OCH_3$ | —$C_2H_5$ | —$CH_2CH_2$— | —$CH_2CH$(—Cl)— | Do. |
| 44 | 6-$SO_2C_4H_9$ | 3-$CH_3$ | —$C_2H_4OCONHC_6H_5$ | —$CH_2CH_2$— | —$CH_2CH$(—SH)— | Do. |
| 45 | 6-$SO_2C_2H_4CN$ | 3-$CH_3$ | —$C_2H_4OCONHC_6H_5$ | —$CH_2CH_2$— | —$CH_2CH$(—SH)— | Do. |
| 46 | 6-$SO_2N(CH_3)_2$ | 3-$CH_3$ | —$C_2H_4OCONHC_6H_5$ | —$CH_2CH_2$— | —$CH_2CH$(—OH)— | Do. |
| 47 | 6-$CH_3$ | 3-$CH_3$ | —$C_2H_4OCONHC_6H_5$ | —$CH_2CH_2$— | —$CH_2CH$(—OH)— | Do. |
| 48 | 6-$CH_3$ | None | —$C_2H_4OCONHC_6H_5$ | —$CH_2CH_2$— | —$CH_2CH$(—OH)— | Scarlet. |
| 9 | None | None | —$C_2H_4OCONHC_6H_5$ | —$CH_2CH_2$— | —$CH_2CH$(—OH)— | Do. |
| 50 | 6-$OCH_3$ | 3-$CH_3$ | —$C_2H_4$N(CO—Z—CO) (phthalimido) | —$CH_2CH_2$— | —$CH_2CH$(—OH)— | Red. |
| 51 | 4,6-di-Cl | 3-$CH_3$ | —$C_2H_5$ | —$CH_2CH_2$— | —$CH_2CH$(—OH)— | Do. |
| 52 | 4,6-di-Cl | 3-$CH_3$ | —$C_2H_4CN$ | —$CH_2CH_2$— | —$CH_2CH$(—OH)— | Do. |
| 53 | 6-Cl | 3-$CH_3$ | —$C_2H_5$ | —$CH_2CH_2CH_2$— | —$CH_2CH$(—OH)— | Do. |
| 54 | 6-SCN | 3-$CH_3$ | —$C_2H_4COOC_2H_5$ | —$CH_2CH_2$ | —$CH_2CH$(—$OCOCH_3$)— | Do. |

TABLE—Continued

| Example | Substituents on Ring A | Substituents on Ring B | $R_2$ | $R_3$ | Z | Color |
|---|---|---|---|---|---|---|
| 55 | 6-SCN | 3-CH$_3$ | —C$_2$H$_5$ | —CH$_2$CH$_2$ | —CH$_2$CH(Cl)— | Do. |
| 56 | 6-SCN | 3-CH$_3$ | Phenyl | —CH$_2$CH$_2$ | —CH$_2$CH(Cl)— | Do. |
| 57 | 6-NHCOCH$_3$ | 3-CH$_3$ | —C$_2$H$_5$ | —CH$_2$CH$_2$ | —CH$_2$CH(Cl)— | Do. |
| 58 | 6-NHCOCH$_3$ | 3-CH$_3$ | —C$_2$H$_5$ | —CH$_2$CH$_2$ | —CH$_2$CH(OH)— | Do. |

The invention has been described in considerable detail with particular reference to certain preferred embodiments thereof, but it will be understood that variations and modifications can be effected within the spirit and scope of the invention as described hereinabove, and as defined in the appended claims.

We claim:

1. A water-insoluble azo compound having the general formula:

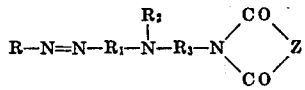

wherein
R=a 2-benzothiazoyl group,
$R_1$=p-phenylene or p-phenylene substituted with lower alkyl, lower alkoxy, halogen, lower alkylthio, lower alkanoylamino, lower alkylsulfonamido or benzamido,
$R_2$=lower alkyl; lower alkyl substituted with hydroxy, lower alkoxy, cyano, lower alkanoyloxy, lower carbalkoxy, halogen, lower alkylsulfonyl, lower alkyl—OCOO—, carbamoyl, lower alkylcarbamoyl, phenyl, phenoxy, or lower alkylsulfonamido; cyclohexyl; phenyl; or phenyl substituted with lower alkyl, lower alkoxy or halogen,
$R_3$=lower alkylene, lower hydroxyalkylene, lower alkanoyloxyalkylene, or lower chloroalkylene, and
Z=one of the groups

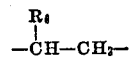

or

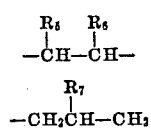

in which $R_4$ represents hydroxyl, phenylcarbamoyloxy, lower alkylcarbamoyloxy, halogen, mercapto, lower alkylthio, lower alkanoyl, hydroxyl, lower alkanoylovy, amino, lower alganoylamino or carbamoyl; both $R_5$ and $R_6$ represent hydroxyl, halogen or lower alkanoyloxy; or $R_5$ represents halogen when $R_6$ is hydroxyl or lower alkanoyloxy; $R_7$ represents halogen, hydroxy, lower alkoxy or lower alkanoyloxy.

2. A water-insoluble azo compound having the general formula:

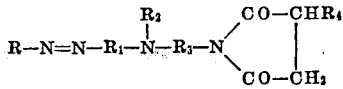

wherein
R=a 2-benzothiazoyl group,
$R_1$=p-phenylene or p-phenylene substituted with lower alkyl, lower alkoxy, halogen, lower alkylthio, lower alkanoylamino, lower alkylsulfonamido or benzamido,
$R_2$=lower alkyl or lower alkyl substituted with lower alkoxy, phenoxy, lower alkanoyloxy, halogen, hydroxy, carbethoxy, or cyano,
$R_3$=lower alkylene, and
$R_4$=hydroxyl, phenylcarbamoyloxy, lower alkylcarbamoyloxy, halogen, mercapto, lower alkylthio, lower alkanoyl, lower alkanoyloxy, hydroxyl, amino lower alkanoylamino or carbamoyl.

3. An azo compound designated in claim 2 wherein $R_4$ is a hydroxy, lower alkanoyloxy, phenylcarbamoyloxy or lower alkylcarbamoyloxy group.

4. The compound

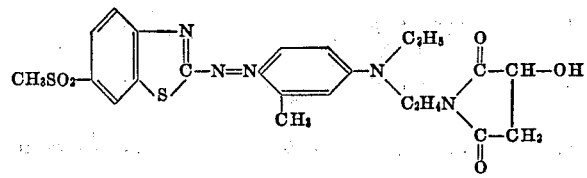

5. The compound

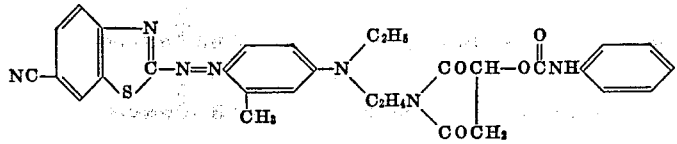

6. The compound

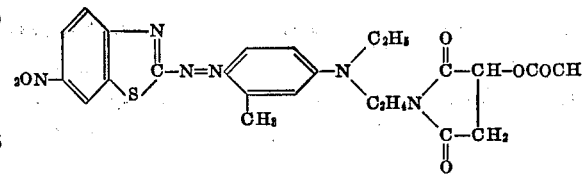

7. The compound

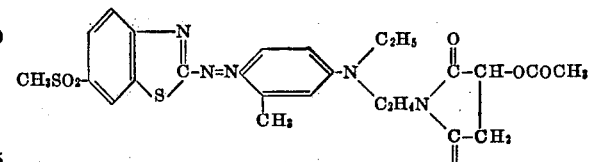

8. The compound
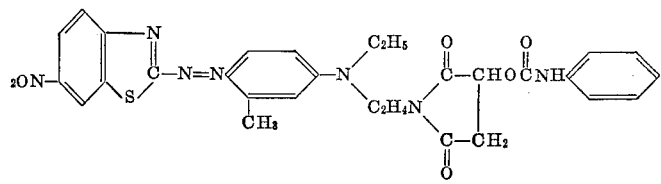
References Cited
UNITED STATES PATENTS
3,161,631  12/1964  Straley et al. _____ 260—158
CHARLES B. PARKER, *Primary Examiner.*
D. M. PAPUGA, *Assistant Examiner.*
U.S. Cl. X.R.
260—305, 37, 326.5; 8—41, 55